United States Patent
Li et al.

(10) Patent No.: US 10,827,401 B2
(45) Date of Patent: *Nov. 3, 2020

(54) CELL HANDOVER METHOD, APPARATUS, AND SYSTEM

(71) Applicant: Huawei Technologies Co., Ltd., Shenzhen (CN)

(72) Inventors: Yunzhou Li, Beijing (CN); Xinxin Liu, Beijing (CN); Jing Wang, Beijing (CN); Yalin Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/409,233

(22) Filed: May 10, 2019

(65) Prior Publication Data
US 2019/0268812 A1    Aug. 29, 2019

Related U.S. Application Data

(63) Continuation of application No. PCT/CN2017/110842, filed on Nov. 14, 2017.

(30) Foreign Application Priority Data

Nov. 14, 2016   (CN) .......................... 2016 1 0998903

(51) Int. Cl.
*H04W 36/00*   (2009.01)
*H04W 8/08*   (2009.01)
(Continued)

(52) U.S. Cl.
CPC ......... *H04W 36/0077* (2013.01); *H04W 8/08* (2013.01); *H04W 36/0033* (2013.01);
(Continued)

(58) Field of Classification Search
CPC ......... H04W 36/0077; H04W 36/0085; H04W 36/32; H04W 36/00837; H04W 36/0072; H04W 36/0083
See application file for complete search history.

(56) References Cited

U.S. PATENT DOCUMENTS

| 2005/0026619 A1 | 2/2005 | Jha |
| 2009/0168722 A1* | 7/2009 | Saifullah ........... H04W 36/0033 370/331 |

(Continued)

FOREIGN PATENT DOCUMENTS

| CN | 102056261 A | 5/2011 |
| CN | 104780572 A | 7/2015 |

(Continued)

OTHER PUBLICATIONS

Mohamed, E., et al. "Delayed Offloading Zone Associations using Cloud Cooperated Heterogeneous Networks," XP032786291, 8th International Wireless Distributed Networks Workshop on Cooperative and Heterogeneous Cellular Networks, 2015, pp. 374-379.

(Continued)

*Primary Examiner* — Hashim S Bhatti
(74) *Attorney, Agent, or Firm* — Conley Rose, P.C.

(57) ABSTRACT

A cell handover method, apparatus, and system, where the cell handover method includes receiving, by a mobile edge computing (MEC) server, status information of a mobile terminal from a source cell, where the status information includes location information and speed information, determining, by the MEC server, a target cell based on the status information, where the MEC server serves the target cell, the target cell is neighboring to the source cell, and coverage of the target cell partially overlaps coverage of the source cell, and sending, by the MEC server, an identifier of the target cell to the mobile terminal using the source cell. According to the cell handover method, apparatus, and system provided (Continued)

in this application, cell handover is controlled using the MEC server to improve efficiency of the cell handover.

16 Claims, 7 Drawing Sheets

(51) Int. Cl.
*H04W 36/04* (2009.01)
*H04W 36/16* (2009.01)
*H04W 36/30* (2009.01)
*H04W 36/32* (2009.01)
*H04W 36/24* (2009.01)

(52) U.S. Cl.
CPC ....... *H04W 36/0085* (2018.08); *H04W 36/04* (2013.01); *H04W 36/165* (2013.01); *H04W 36/30* (2013.01); *H04W 36/32* (2013.01); H04W 36/00837 (2018.08); H04W 36/245 (2013.01)

(56) References Cited

U.S. PATENT DOCUMENTS

| | | | |
|---|---|---|---|
| 2011/0058529 A1 | 3/2011 | Uemura | |
| 2012/0178462 A1 | 7/2012 | Kim | |
| 2013/0005340 A1* | 1/2013 | Drazynski | H04W 8/186 455/436 |
| 2013/0095839 A1* | 4/2013 | Venkatraman | H04W 36/04 455/444 |
| 2015/0038140 A1* | 2/2015 | Kilpatrick, II | H04W 68/02 455/436 |
| 2016/0112922 A1* | 4/2016 | Han | H04W 72/12 455/436 |
| 2016/0381611 A1 | 12/2016 | Uchino et al. | |
| 2017/0105146 A1* | 4/2017 | Zeng | H04W 64/00 |
| 2018/0001916 A1 | 1/2018 | Aoyama et al. | |
| 2018/0063261 A1* | 3/2018 | Moghe | G08G 1/0133 |
| 2018/0077610 A1 | 3/2018 | Onishi et al. | |
| 2018/0139691 A1 | 5/2018 | Onishi et al. | |
| 2019/0150043 A1* | 5/2019 | Lundqvist | H04W 36/30 370/331 |
| 2019/0191297 A1* | 6/2019 | Huang | H04W 76/27 |

FOREIGN PATENT DOCUMENTS

| | | |
|---|---|---|
| CN | 105791392 A | 7/2016 |
| CN | 106100907 A | 11/2016 |
| EP | 3277025 A1 | 1/2018 |
| EP | 3277025 B1 | 1/2020 |
| JP | 2007500968 A | 1/2007 |
| JP | 2011097154 A | 5/2011 |
| JP | 2014207582 A | 10/2014 |
| WO | 2005013635 A1 | 2/2005 |
| WO | 2009020109 A1 | 2/2009 |
| WO | 2010002230 A2 | 1/2010 |
| WO | 2016031779 A1 | 3/2016 |
| WO | 2016114762 A1 | 7/2016 |
| WO | 2016139807 A1 | 9/2016 |
| WO | 2016147628 A1 | 9/2016 |
| WO | 2016155162 A1 | 10/2016 |
| WO | 2016174864 A1 | 11/2016 |

OTHER PUBLICATIONS

Huawei, "Mobile-Edge Computing—Introductory Technical White Paper," XP050899567, Issue 1, Sep. 2014, 36 pages.
Foreign Communication From a Counterpart Application, European Application No. 17869224.0, Extended European Search Report dated Jul. 29, 2019, 12 pages.
Fujinami, M., et al., "Introduction of SDN into mobile network to realize traffic offloading and handover," IEICE Technical Report, Japan, The Institute of Electronics, Information and Communication Engineers, Apr. 2015, vol. 115, No. 10, 9 pages, with English translation.
Machine Translation and Abstract of Chinese Publication No. CN102056261, May 11, 2011, 22 pages.
Machine Translation and Abstract of Chinese Publication No. CN105791392, Jul. 20, 2016, 26 pages.
Machine Translation and Abstract of Chinese Publication No. CN106100907, Nov. 9, 2016, 19 pages.
Chang, C., et al. "Analyzing MEC Architectural Implications for LTE/LTE-A," EUROCOM, May 4th, 2016, 28 pages.
Foreign Communication From a Counterpart Application, PCT Application No. PCT/CN2017/110842, English Translation of International Search Report dated Jan. 26, 2018, 2 pages.
Foreign Communication From a Counterpart Application, PCT Application No. PCT/CN2017/110842, English Translation of Written opinion dated Jan. 26, 2018, 4 pages.
CATT, "Consideration on RACH-less handover," 3GPP TSG RAN WG2 Meeting #93bis; R2-162517, Dubrovnik, Croatia, Apr. 11-15, 2016, 4 pages. XP051082147.
CATT, "UL grant in target cell for RACHless handover," 3GPP TSG RAN WG2 Meeting #94; R2-163564, Nanjing, China, May 23-27, 2016, 2 pages. XP051095408.
CATT: "Issues on RACH-less handover",3GPP TSG RAN WG2 Meeting #95; R2-165181, Gothenburg, Sweden, Aug. 22-26, 2016, 4 pages. XP051134150.
Intel Corporation: "RACH-less handover for small cell",3GPP TSG RAN WG2 Meeting #94; R2-165781, Gothenburg, Sweden, Aug. 22-26, 2016, 10 pages. XP051127154.

* cited by examiner

CELL HANDOVER METHOD, APPARATUS, AND SYSTEM

CROSS-REFERENCE TO RELATED APPLICATIONS

This application is a continuation of International Patent Application No. PCT/CN2017/110842 filed on Nov. 14, 2017, which claims priority to Chinese Patent Application No. 201610998903.2 filed on Nov. 14, 2016. The disclosures of the aforementioned applications are hereby incorporated by reference in their entireties.

TECHNICAL FIELD

Embodiments of this application relate to the communications field, and in particular, to a cell handover method, apparatus, and system in the communications field.

BACKGROUND

Mobile edge computing (MEC) is a technology proposed by the European Telecommunications Standards Institute that deeply integrates a wireless network and an Internet service based on a fifth-generation (5G) evolved architecture. The MEC is a proximity computing architecture deployed at an edge of a mobile network, and can provide a mobile cloud computing service for a terminal user using a radio access network.

An intelligent transport system (ITS) is a real-time, accurate, and efficient integrated transport management system established by applying an advanced information technology, a data communication transmission technology, a sensor technology, an embedded technology, an electronic control technology, a computer processing technology, a distributed computer technology, a cloud computing technology, and the like to transport management.

An intelligent transportation service relates to road safety and efficient vehicle management, and therefore has relatively high requirements on a latency and reliability. Usually, a propagation latency of a safety message needs to be controlled less than 10 milliseconds (ms). In terms of the reliability, a relatively high packet transmission ratio and a relatively high packet reception ratio need to be ensured. In a highway scenario, a vehicle moving speed and an information updating frequency are both high. Therefore, vehicle mobility management, especially fast cell handover, needs to be reinforced.

A conventional cell handover method is completed through interaction between a terminal and a source base station. The source base station sends a measurement control message to the terminal. A user measures a downlink pilot signal of each of all possible target cells based on the received measurement control information, and sends measurement reports of all the possible target cells to the source base station. The source base station determines, in all the possible target cells based on the measurement reports, a target cell to which the terminal finally hands over.

In an existing cell handover procedure, the source base station needs to measure all the possible target cells for a plurality of times to determine the final target cell. Therefore, a process is relatively complex, and handover efficiency is relatively low.

SUMMARY

This application provides a cell handover method, apparatus, and system to improve efficiency of cell handover.

According to a first aspect, this application provides a cell handover method, including receiving, by a MEC server, status information of a mobile terminal that is sent by a source cell, where the status information includes location information and speed information, the source cell serves the mobile terminal, and the MEC server serves the source cell, determining, by the MEC server, a target cell based on the status information, where the MEC server serves the target cell, the target cell is neighboring to the source cell, and coverage of the target cell partially overlaps coverage of the source cell, and sending, by the MEC server, an identifier of the target cell to the mobile terminal using the source cell.

According to the cell handover method provided in this application, the MEC server determines the target cell based on the location information and the speed information of the mobile terminal, and sends the identifier of the target cell to the mobile terminal such that the mobile terminal hands over to the target cell to improve efficiency of cell handover.

It should be understood that in this embodiment of this application, the source cell and the target cell may belong to different base stations. The MEC server may be considered as an upper-level network node of these base stations and can cover a plurality of consecutive cells. The MEC server is connected to the plurality of cells within coverage of the MEC server in a wired manner to implement efficient and reliable communication.

In addition, considering a problem of poor handover performance of the mobile terminal that may exist when the mobile terminal crosses between two cells at edges of coverage of MEC servers, a wired connection is set up between an edge cell and each of two neighboring MEC servers that are adjacent to the edge cell. According to this MEC edge server deployment method, handover of the mobile terminal between any two neighboring cells may be considered as handover within coverage of a same MEC server. A handover process of the mobile terminal may be computed and controlled by the corresponding MEC server to improve reliability and the efficiency of the cell handover.

With reference to the first aspect, in a first possible implementation of the first aspect, the method further includes obtaining, by the MEC server, information about a handover area between the source cell and the target cell, where the handover area is used for cell handover of the mobile terminal, and determining, by the MEC server based on the status information and the information about the handover area, a handover time point at which a serving cell of the mobile terminal is switched from the source cell to the target cell. The sending, by the MEC server, an identifier of the target cell to the mobile terminal using the source cell includes sending, by the MEC server, the identifier of the target cell and information about the handover time point to the mobile terminal using the source cell.

According to the cell handover method provided in this application, the MEC server determines the handover time point based on the information about the handover area between the source cell and the target cell and the status information of the mobile terminal, and sends the handover time point and the identifier of the target cell to the mobile terminal such that the mobile terminal hands over to the target cell at the handover time point to further improve the handover efficiency.

According to the cell handover method provided in this application, after learning of the handover time point, the source cell and the target cell may prepare for the cell handover in advance to improve the handover efficiency and make the handover process smoother.

Optionally, the MEC server may obtain travel path information of the mobile terminal. The travel path information is used to indicate a travel path of the mobile terminal from a starting location to a destination location. The MEC server determines the target cell based on the status information and the travel path information.

Optionally, the MEC server may obtain the travel path information of the mobile terminal that is stored in a cloud server. Alternatively, the MEC server may send a travel path request to the mobile terminal, and receive the travel path information of the mobile terminal that is sent by the mobile terminal based on the travel path request. This is not limited in this embodiment of this application.

According to the cell handover method provided in this application, the MEC server may determine the target cell based on the location information and the speed information of the mobile terminal and the travel path information of the mobile terminal to improve the efficiency and reliability of the cell handover based on predictability of a road scenario.

Optionally, the MEC server may alternatively obtain information about an overlapping area between the source cell and the target cell. The information about the overlapping area is used to indicate an overlapping part between the coverage of the source cell and the coverage of the target cell. The MEC server determines the target cell based on the status information and the information about the overlapping area. This is not limited in this application.

Optionally, the MEC server may pre-store information about an overlapping area between any two neighboring cells within the coverage of the MEC server. Alternatively, the MEC server may request, from the source cell, information about an overlapping area between the source cell and another cell neighboring to the source cell. This is not limited in this embodiment of this application.

According to the cell handover method provided in this application, the MEC server may determine the target cell based on the location information and the speed information of the mobile terminal, and the information about the overlapping area to further improve the efficiency and reliability of the cell handover.

Optionally, the MEC server may further obtain real-time road environment information from the cloud server. The road environment information includes a road congestion status and a road obstacle status of the travel path of the mobile terminal and information about a travel status of another mobile terminal nearby.

According to the cell handover method provided in this application, the MEC server may determine the target cell based on the location information and the speed information of the mobile terminal, the travel path information of the mobile terminal, and the road environment information to further improve the efficiency and reliability of the cell handover.

With reference to the first possible implementation of the first aspect, in a second possible implementation of the first aspect, obtaining, by the MEC server, information about a handover area between the source cell and the target cell, where the handover area is used for cell handover of the mobile terminal, includes obtaining, by the MEC server, a first signal strength value obtained by the source cell by measuring an uplink signal of a test mobile terminal used for testing and a second signal strength value obtained by the target cell by measuring the uplink signal, where the test mobile terminal is located in an overlapping area between the coverage of the source cell and the coverage of the target cell, and determining, by the MEC server, an area through which the test mobile terminal passes and in which a difference between the first signal strength value and the second signal strength value is less than a first threshold as the handover area.

According to the cell handover method provided in this application, the MEC server obtains measurement results obtained by the source cell and the target cell by measuring the uplink signal of the test mobile terminal for a plurality of times to obtain the handover area including location points at which signal strength received by the terminal from two cell base stations is approximate in the overlapping area between the source cell and the target cell. The cell handover is performed in the handover area to improve a success rate of the cell handover.

With reference to the first or the second possible implementation of the first aspect, in a third possible implementation of the first aspect, determining, by the MEC server based on the status information and the information about the handover area, a handover time point at which a serving cell of the mobile terminal is switched from the source cell to the target cell includes determining, by the MEC server, the handover time point based on the status information, the information about the handover area, and at least one of transition duration information and resource configuration information. The transition duration information is used to indicate duration required by the source cell and the target cell for transiting a Packet Data Convergence Protocol (PDCP) sequence number (SN) status of the mobile terminal, and the resource configuration information is used to indicate current usage of an uplink resource of the target cell.

According to the cell handover method provided in this application, the duration of transiting the SN status of the mobile terminal by the source cell and the target cell is considered when the MEC server determines the handover time point, to ensure that the source cell and the target cell have completed the transition of the SN status before the handover time point comes such that the mobile terminal can smoothly perform the cell handover at the handover time point, thereby improving quality of user experience in the cell handover process.

With reference to any one of the first to the third possible implementations of the first aspect, in a fourth possible implementation of the first aspect, the method further includes determining, by the MEC server based on the handover time point and the current usage of the uplink resource of the target cell, an uplink resource reserved by the target cell for the mobile terminal. Sending, by the MEC server, the identifier of the target cell and information about the handover time point to the mobile terminal using the source cell includes sending, by the MEC server, the identifier of the target cell, the information about the handover time point, and information about the uplink resource to the mobile terminal using the source cell.

According to the cell handover method provided in this application, the MEC server determines, based on the current usage of the uplink resource of the target cell and the handover time point, an idle resource of the target cell that is used at the handover time point, and enables the target cell to reserve the idle resource for the mobile terminal at the handover time point to improve the efficiency of the cell handover.

With reference to the fourth possible implementation of the first aspect, in a fifth possible implementation of the first aspect, after determining, by the MEC server based on the handover time point and the current usage of the uplink resource of the target cell, an uplink resource reserved by the target cell for the mobile terminal, the method further includes sending, by the MEC server, an identifier of the mobile terminal, the information about the handover time point, and the information about the uplink resource to the target cell.

According to the cell handover method provided in this application, the MEC server notifies the target cell of the identifier of the mobile terminal, the information about the handover time point, and the information about the reserved uplink resource. The target cell only needs to reserve the resource for the mobile terminal at the handover time point to improve resource utilization of the target cell.

With reference to any one of the first to the fifth possible implementations of the first aspect, in a sixth possible implementation of the first aspect, the method further includes obtaining, by the MEC server, system timing of the source cell and system timing of the target cell, determining, by the MEC server, a timing advance of the mobile terminal based on a difference between the system timing of the source cell and the system timing of the target cell. The timing advance is used by the mobile terminal to synchronize with the target cell. The sending, by the MEC server, the identifier of the target cell and information about the handover time point to the mobile terminal using the source cell includes sending, by the MEC server, the identifier of the target cell, the information about the handover time point, and information about the timing advance to the mobile terminal using the source cell.

According to the cell handover method provided in this application, the MEC server sends timing advances of the mobile terminal to the mobile terminal such that the mobile terminal adjusts timing of the mobile terminal based on the timing advance, and establishes downlink synchronization with the target cell.

In addition, the mobile terminal may receive a primary signal, a secondary signal, a reference signal, and the like that are sent by the target cell to automatically establish uplink synchronization with the target cell. This is not limited in this application.

According to a second aspect, this application provides a cell handover method, including sending, by a source cell, status information of a mobile terminal to a MEC server, where the status information includes location information and speed information, the MEC server serves the source cell, and the source cell serves the mobile terminal, receiving, by the source cell, an identifier of a target cell that is sent by the MEC server based on the status information, and sending, by the source cell, the identifier of the target cell to the mobile terminal.

According to the cell handover method provided in this application, the source cell reports the status information of the mobile terminal to the MEC server, receives the identifier of the target cell that is sent by the MEC server based on the status information, and sends the identifier of the target cell to the mobile terminal such that the mobile terminal performs cell handover based on the identifier of the target cell.

With reference to the second aspect, in a first possible implementation of the second aspect, the method further includes receiving, by the source cell, at least one of information about a handover time point at which a serving cell of the mobile terminal is switched from the source cell to the target cell and information about an uplink resource reserved by the target cell for the mobile terminal that are sent by the MEC server based on the status information. Sending, by the source cell, the identifier of the target cell to the mobile terminal includes sending, by the source cell, the identifier of the target cell and the at least one of the information about the handover time point and the information about the uplink resource to the mobile terminal.

According to the cell handover method provided in this application, the source cell sends the identifier of the target cell and the at least one of the information about the handover time point and the information about the uplink resource to the mobile terminal such that the mobile terminal sets up a connection to the target cell based on the foregoing information to improve efficiency and reliability of the cell handover.

With reference to the first possible implementation of the second aspect, in a second possible implementation of the second aspect, after sending, by the source cell, the identifier of the target cell and the at least one of the information about the handover time point and the information about the uplink resource to the mobile terminal, the method further includes disconnecting, by the source cell, a connection to the mobile terminal at the handover time point.

According to the cell handover method provided in this application, the source cell disconnects the connection to the mobile terminal at the handover time point, and the mobile terminal device sets up a new connection to the target cell to implement smooth handover between the source cell and the target cell, and improve quality of user experience in a cell handover process.

Optionally, after sending the identifier of the target cell and the at least one of the information about the handover time point and the information about the uplink resource to the mobile terminal, the source cell automatically releases, at the handover time point, a radio resource control (RRC) resource used by the mobile terminal to improve utilization of the RRC resource of the source cell.

With reference to the second possible implementation of the second aspect, in a third possible implementation of the second aspect, before disconnecting, by the source cell, a connection to the mobile terminal at the handover time point, the method further includes sending, by the source cell, information about an SN status of the mobile terminal to the target cell.

According to the cell handover method provided in this application, the source cell and the target cell complete transition of the SN status of the mobile terminal before the handover time point to eliminate a time required by the source cell and the target cell for transiting the SN status in a handover process in the other approaches to improve the efficiency of the cell handover.

According to a third aspect, this application provides a cell handover method, including receiving, by a target cell, an identifier of a mobile terminal and at least one of information about a handover time point at which the mobile terminal performs cell handover and information about an uplink resource reserved by the target cell for the mobile terminal that are sent by a MEC server, and setting up, by the target cell, a connection to the mobile terminal based on the identifier of the mobile terminal and the at least one of the information about the handover time point and the information about the uplink resource.

According to the cell handover method provided in this application, the target cell sets up the connection to the mobile terminal based on the identifier of the mobile terminal and the at least one of the information about the handover time point and the information about the uplink resource that are sent by the MEC server to improve resource utilization of the target cell and reliability of cell handover.

With reference to the third aspect, in a first possible implementation of the third aspect, before setting up, by the target cell, a connection to the mobile terminal based on the identifier of the mobile terminal and the at least one of the information about the handover time point and the information about the uplink resource, the method further includes receiving, by the target cell, information about an SN status of the mobile terminal that is sent by the source cell.

According to the cell handover method provided in this application, the target cell and the source cell complete transition of the SN status of the mobile terminal before the handover time point to eliminate a time required by the source cell and the target cell for transiting the SN status in a handover process in the other approaches to improve efficiency of the cell handover.

According to a fourth aspect, this application provides a cell handover method, including sending, by a mobile terminal, status information to a MEC server using a source cell, where the status information includes location information and speed information of the mobile terminal, the MEC server serves the source cell, and the source cell serves the mobile terminal, receiving, by the mobile terminal, an identifier of a target cell that is sent by the MEC server based on the status information, and handing over, by the mobile terminal, from the source cell to the target cell based on the identifier of the target cell.

According to the cell handover method provided in this application, the mobile terminal reports the status information to the MEC server using the source cell, and hands over from the source cell to the target cell based on the identifier of the target cell that is sent by the MEC server based on the status information to improve efficiency of cell handover.

With reference to the fourth aspect, in a first possible implementation of the fourth aspect, the method further includes receiving, by the mobile terminal, information that is sent by the MEC server based on the status information and that is about a handover time point at which the mobile terminal hands over from the source cell to the target cell. The handing over, by the mobile terminal, from the source cell to the target cell based on the identifier of the target cell includes handing over, by the mobile terminal, from the source cell to the target cell based on the identifier of the target cell and the information about the handover time point.

According to the cell handover method provided in this application, the mobile terminal hands over from the source cell to the target cell based on the identifier of the target cell and the information about the handover time point such that the mobile terminal can smoothly hand over from the source cell to the target cell to further improve the efficiency of the cell handover.

With reference to the first possible implementation of the fourth aspect, in a second possible implementation of the first aspect, the method further includes receiving, by the mobile terminal, information that is sent by the MEC server based on the status information and that is about an uplink resource reserved by the target cell for the mobile terminal. Handing over, by the mobile terminal, from the source cell to the target cell based on the identifier of the target cell and the information about the handover time point includes handing over, by the mobile terminal, from the source cell to the target cell based on the identifier of the target cell, the information about the handover time point, and the information about the uplink resource.

According to the cell handover method provided in this application, the mobile terminal hands over from the source cell to the target cell based on the identifier of the target cell, the information about the handover time point, and the information about the uplink resource to improve the efficiency of the cell handover, and improve quality of user experience.

With reference to the first or the second possible implementation of the fourth aspect, in a third possible implementation of the fourth aspect, after receiving, by the mobile terminal, information that is sent by the MEC server based on the status information and that is about a handover time point at which the mobile terminal hands over from the source cell to the target cell, the method further includes disconnecting, by the mobile terminal, a connection to the source cell at the handover time point.

According to a fifth aspect, this application provides a cell handover apparatus configured to perform the cell handover method according to the first aspect or any possible implementation of the first aspect. Further, the apparatus includes units configured to perform the cell handover method according to the first aspect or any possible implementation of the first aspect.

According to a sixth aspect, this application provides a cell handover apparatus configured to perform the cell handover method according to the second aspect or any possible implementation of the second aspect. Further, the apparatus includes units configured to perform the cell handover method according to the second aspect or any possible implementation of the second aspect.

According to a seventh aspect, this application provides a cell handover apparatus configured to perform the cell handover method according to the third aspect or any possible implementation of the third aspect. Further, the apparatus includes units configured to perform the cell handover method according to the third aspect or any possible implementation of the third aspect.

According to an eighth aspect, this application provides a cell handover apparatus configured to perform the cell handover method according to the fourth aspect or any possible implementation of the fourth aspect. Further, the apparatus includes units configured to perform the cell handover method according to the fourth aspect or any possible implementation of the fourth aspect.

According to a ninth aspect, this application provides a cell handover apparatus. The apparatus includes a receiver, a transmitter, a memory, a processor, and a bus system. The receiver, the transmitter, the memory, and the processor are connected using the bus system. The memory is configured to store an instruction. The processor is configured to execute the instruction stored in the memory, and control the transmitter to send a signal. In addition, when the processor executes the instruction stored in the memory, the execution enables the processor to perform the method according to the first aspect or any possible implementation of the first aspect.

According to a tenth aspect, this application provides a cell handover apparatus. The apparatus includes a receiver, a transmitter, a memory, a processor, and a bus system. The receiver, the transmitter, the memory, and the processor are connected using the bus system. The memory is configured to store an instruction. The processor is configured to execute the instruction stored in the memory, and control the transmitter to send a signal. In addition, when the processor executes the instruction stored in the memory, the execution enables the processor to perform the method according to the second aspect or any possible implementation of the second aspect.

According to an eleventh aspect, this application provides a cell handover apparatus. The apparatus includes a receiver, a transmitter, a memory, a processor, and a bus system. The receiver, the transmitter, the memory, and the processor are connected using the bus system. The memory is configured to store an instruction. The processor is configured to execute the instruction stored in the memory, and control the transmitter to send a signal. In addition, when the processor executes the instruction stored in the memory, the execution enables the processor to perform the method according to the third aspect or any possible implementation of the third aspect.

According to a twelfth aspect, this application provides a cell handover apparatus. The apparatus includes a receiver, a transmitter, a memory, a processor, and a bus system. The receiver, the transmitter, the memory, and the processor are connected using the bus system. The memory is configured to store an instruction. The processor is configured to execute the instruction stored in the memory, and control the transmitter to send a signal. In addition, when the processor executes the instruction stored in the memory, the execution enables the processor to perform the method according to the fourth aspect or any possible implementation of the fourth aspect.

According to a thirteenth aspect, this application provides a computer-readable medium configured to store a computer program. The computer program includes an instruction used to perform the method according to the first aspect or any possible implementation of the first aspect.

According to a fourteenth aspect, this application provides a computer-readable medium configured to store a computer program. The computer program includes an instruction used to perform the method according to the second aspect or any possible implementation of the second aspect.

According to a fifteenth aspect, this application provides a computer-readable medium configured to store a computer program. The computer program includes an instruction used to perform the method according to the third aspect or any possible implementation of the third aspect.

According to a sixteenth aspect, this application provides a computer-readable medium configured to store a computer program. The computer program includes an instruction used to perform the method according to the fourth aspect or any possible implementation of the fourth aspect.

According to a seventeenth aspect, this application provides a cell handover system. Further, the system includes units configured to perform the method according to the first aspect or any possible implementation of the first aspect, units configured to perform the method according to the second aspect or any possible implementation of the second aspect, units configured to perform the method according to the third aspect or any possible implementation of the third aspect, and units configured to perform the method according to the fourth aspect or any possible implementation of the fourth aspect.

DESCRIPTION OF EMBODIMENTS

Figure 1:
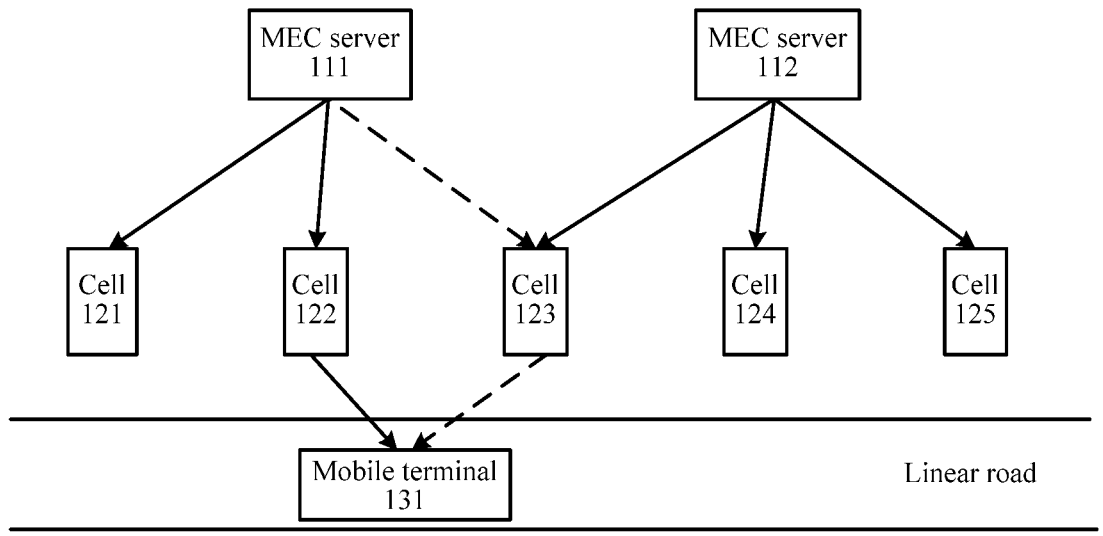
FIG. 1 is a schematic architectural diagram of a linear road scenario according to an embodiment of this application.

The technical solutions in the embodiments of this application are described below with reference to the accompanying drawings in the embodiments of this application.

It should be understood that, the technical solutions of the embodiments of this application may be applied to various communications systems, such as a Global System for Mobile Communications (GSM) system, a Code Division Multiple Access (CDMA) system, a Wideband CDMA (WCDMA) system, a general packet radio service (GPRS) system, a Long Term Evolution (LTE) system, an LTE frequency division duplex (FDD) system, an LTE time division duplex (TDD) system, a Universal Mobile Telecommunications System (UMTS), a worldwide interoperability for microwave access (WIMAX) communications system, and a future communications system.

It should also be understood that in the embodiments of this application, a mobile terminal may be referred to as a terminal, a mobile station (MS), user equipment (UE), and the like. The mobile terminal may communicate with one or more core networks through a radio access network (RAN). For example, the mobile terminal may be a mobile phone (also referred to as a cellular phone) or a computer with a mobile terminal. For example, the user equipment may also be a portable, pocket-sized, handheld, computer built-in, or in-vehicle mobile apparatus, which exchanges voice and/or data with the radio access network.

In the embodiments of this application, an access network device may be a base station controller (BSC) in GSM or CDMA, or may be a radio node controller (RNC) in WCDMA, or may be an evolved NodeB (eNB or e-NodeB) in LTE. This is not limited in this application. However, for ease of description, the following embodiments are described using an eNB as an example.

A MEC server is a proximity computing architecture deployed at an edge of a mobile network, provides a big data service, an Internet-of-Things service, and a data service at the edge of the mobile network, and provides an open application programming interface (API) to a third party to quickly deploy a new service. For example, the MEC server can obtain wireless network information and status information of a mobile terminal in real time to greatly reduce load of an Internet-of-Vehicles system, and more efficiently and reliably control the mobile terminal and provide diversified services for the mobile terminal.

In an optional embodiment, the MEC server may create a carrier-grade service environment with high efficiency and a low latency using a small server having lower costs that is deployed on a base station or around the base station to reduce bandwidth consumption of a transport network, balance load of a network center, and shorten a reaction time of a content delivery system such that the user equipment has continuous high-quality network experience.

In another optional embodiment, the MEC server may further transfer a cloud computing capability and a cloud storage capability to near the base station, and provide application integration for the third-party, thereby facilitating intelligence of a base station service, and providing a platform for service innovation of a mobile edge ingress.

It should be understood that descriptions are provided using an example in which the embodiments of this application are applied to an EPS system, but this application is not limited thereto. In addition, the terms "system" and "network" may be used interchangeably in this specification.

FIG. 1 is a schematic architectural diagram of a linear road scenario according to an embodiment of this application. As shown in FIG. 1, an architecture of the linear road scenario includes a plurality of MEC servers (where a MEC server 111 and a MEC server 112 are shown in FIG. 1), a plurality of cells distributed along a linear road (where a cell 121 to a cell 125 are shown in FIG. 1), and at least one mobile terminal (where a mobile terminal 131 is shown in FIG. 1).

In the architecture of the linear road scenario in this embodiment of this application, at an interval of every L consecutive cells (L≥1) in a direction of the linear road, a MEC server located at a center of the L cells may be deployed. The MEC server may be considered as an upper-level network node of the L cells, and can effectively cover the L cells and serve the L cells within coverage of the MEC server. Each cell may belong to different base stations.

It should be understood that the MEC server is connected, in a wired manner, to the base stations to which the L cells within the coverage of the MEC server belong to implement efficient and reliable communication.

Considering a problem of poor handover performance of the mobile terminal that may exist when the mobile terminal crosses between two cells at edges of coverage of MEC servers (where for example, the terminal 131 shown in FIG. 1 traverses from the edge cell 122 of the MEC server 111 to the edge cell 123 of the MEC server 112), a wired connection is set up between an edge base station and each of two neighboring MEC servers. According to this deployment method, handover of the mobile terminal 131 between any two neighboring cells may be considered as handover within coverage of a same MEC server. A handover process of the mobile terminal 131 may be controlled by the corresponding MEC server to facilitate quick and reliable handover of a user.

For example, as shown in FIG. 1, the MEC server 111 covers the cells 121 and 122, and the MEC server 112 covers the cell 123 to the cell 125. During deployment of the MEC server, a connection between the edge cell 123 and the MEC server 111 is set up. Therefore, handover of the mobile terminal 131 between the cell 122 and the cell 123 may be considered as cell handover within coverage of the MEC server 111, and is managed and controlled by the MEC server 111. However, this is not limited in this embodiment of this application.

Figure 2:
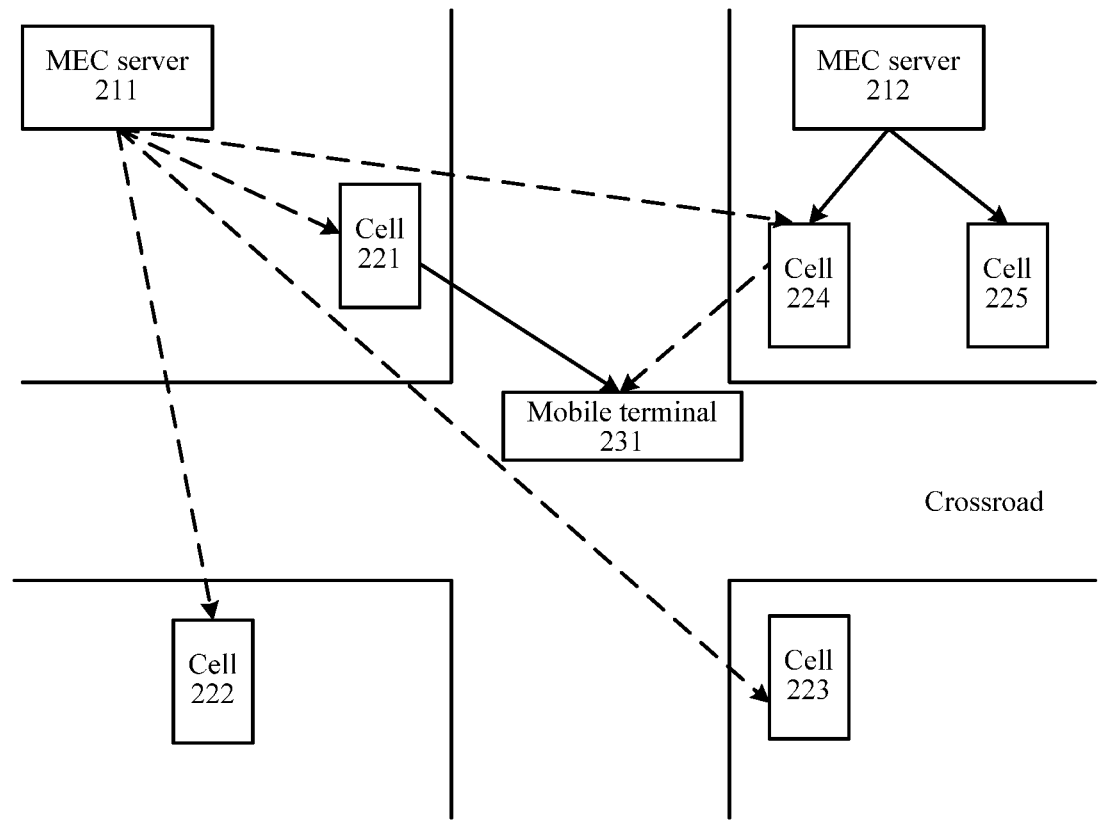
FIG. 2 is a schematic architectural diagram of a crossroad scenario according to an embodiment of this application.

FIG. 2 is a schematic architectural diagram of a crossroad scenario according to an embodiment of this application. Deployment of a MEC server in the crossroad scenario is similar to that in the linear scenario. A difference is that in a structure of the crossroad scenario, roadside base stations closest to a road intersection that are on branch roads are all connected to one MEC server, and each of these base stations is also connected to a MEC server on a corresponding branch road, as shown in FIG. 2. According to this MEC edge server deployment method, cell handover caused by a user by changing a travel direction at the road intersection is also considered as handover within coverage of a same MEC server.

For example, as shown in FIG. 2, a MEC server 212 serves a cell 224 and a cell 225, and a connection between the cell 224 that is used as an edge cell within coverage of the MEC server 212 and each of a MEC server 211 and the MEC server 212 is set up. Similarly, the MEC server 211 may be deployed such that the MEC server 211 covers cells 221 to 224. To be specific, the MEC server 211 is deployed for cells in four intersection directions at the cross-intersection. Therefore, regardless of a cell to which the mobile terminal 231 hands over by moving towards a direction at the cross-intersection, the handover may be considered as cell handover within coverage of the MEC server 212, and is managed and controlled by the MEC server 212. However, this is not limited in this embodiment of this application.

Optionally, a base station is allowed to set up a connection with neighboring two or more MEC servers in a zone having a more complex road condition to cope with diversified moving scenarios. However, this embodiment of this application is not limited thereto.

The scenario architectures to which the embodiments of this application may be applied are described above with reference to FIG. 1 and FIG. 2. A cell handover method in the embodiments of this application is described in detail below with reference to FIG. 3 and FIG. 4.

Figure 3:
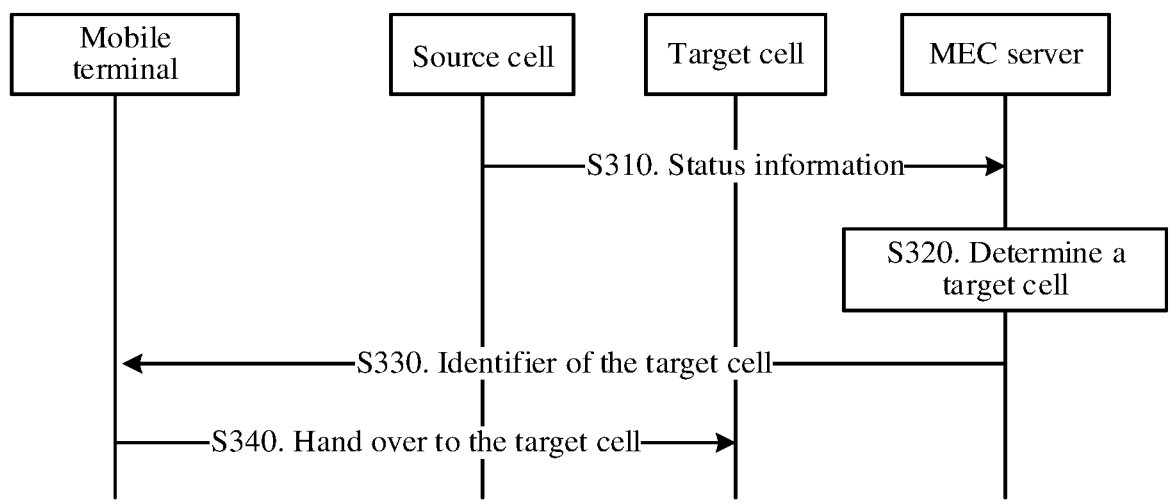
FIG. 3 is a schematic flowchart of a cell handover method according to an embodiment of this application.

FIG. 3 is a schematic flowchart of a cell handover method 300 according to an embodiment of this application. As shown in FIG. 3, the method 300 may be applied to the application scenario in FIG. 1 or FIG. 2. However, this embodiment of this application is not limited thereto.

Step S310: A source cell sends status information of a mobile terminal to a MEC server, where the status information includes location information and speed information, the source cell serves the mobile terminal, and the MEC server serves the source cell.

Step S320: The MEC server determines a target cell based on the status information, where the MEC server serves the target cell, the target cell is neighboring to the source cell, and coverage of the target cell partially overlaps coverage of the source cell.

Step S330: The MEC server sends an identifier of the target cell to the mobile terminal using the source cell.

Step S340: The mobile terminal performs cell handover based on the identifier of the target cell.

According to the cell handover method provided in this embodiment of this application, the MEC server determines the target cell based on the location information and the speed information of the mobile terminal, and sends the identifier of the target cell to the mobile terminal such that the mobile terminal hands over to the target cell to improve efficiency of the cell handover.

Optionally, in step S310, the source cell may obtain the status information of the mobile terminal using a plurality of approaches, and for example, may receive the location information and the speed information (for example, a heartbeat message) that are periodically reported by the mobile terminal or may send a status information request message to the mobile terminal when requiring the mobile terminal to provide the status information. After receiving the status information request message, the mobile terminal reports the status information to the source cell. This is not limited in this embodiment of this application.

Optionally, in step S320, the MEC server may determine the target cell in a plurality of manners.

In an optional embodiment, the MEC server may obtain travel path information of the mobile terminal. The travel path information is used to indicate a travel path of the mobile terminal from a starting location to a destination location. The MEC server determines the target cell based on the status information and the travel path information.

In another optional embodiment, the MEC server may obtain the travel path information of the mobile terminal that is stored in a cloud server. Alternatively, the MEC server may send a travel path request to the mobile terminal, and receive the travel path information of the mobile terminal that is sent by the mobile terminal based on the travel path request. This is not limited in this embodiment of this application.

In another optional embodiment, the MEC server may alternatively obtain information about an overlapping area between the source cell and the target cell. The information about the overlapping area is used to indicate an overlapping part between the coverage of the source cell and the coverage of the target cell. The MEC server determines the target cell based on the status information and the information about the overlapping area. This is not limited in this embodiment of this application.

Optionally, the MEC server may pre-store information about an overlapping area between any two neighboring cells within coverage of the MEC server. Alternatively, the MEC server may request, from the source cell, information about an overlapping area between the source cell and another cell neighboring to the source cell. This is not limited in this embodiment of this application.

In another optional embodiment, the MEC server may further obtain real-time road environment information from the cloud server. The road environment information includes a road congestion status and a road obstacle status of the travel path of the mobile terminal and information about a travel status of another mobile terminal nearby. The MEC server may determine the target cell based on the travel path information of the mobile terminal and the road environment information.

According to the cell handover method provided in this embodiment of this application, the MEC server can determine the target cell based on road predictability in combination with road unexpectedness, to further improve the efficiency and reliability of the cell handover.

It should be understood that there is a handover area used by the mobile terminal to perform the cell handover that is between the source cell and the target cell. More approximate signal strength of an uplink signal received by the source cell and the target cell in the handover area from the mobile terminal indicates a higher success rate of the cell handover performed by the mobile terminal in the area.

Optionally, the MEC server may obtain information about the handover area between the source cell and the target cell in a plurality of manners.

In an optional embodiment, the MEC server may pre-test a test mobile terminal, and pre-store information about a handover area between any two neighboring cells within the coverage of the MEC server. Alternatively, the MEC server may request, from the source cell, information about a handover area between the source cell and another cell neighboring to the source cell. This is not limited in this embodiment of this application.

The MEC server may obtain a first signal strength value obtained by the source cell by measuring an uplink signal of the test mobile terminal used for testing and a second signal strength value obtained by the target cell by measuring the uplink signal, where the test mobile terminal is located in an overlapping area between the coverage of the source cell and the coverage of the target cell, and determine an area through which the test mobile terminal passes and in which a difference between the first signal strength value and the second signal strength value is less than a first threshold as the handover area.

It should also be understood that drive test needs to be periodically performed for statistics of the handover area, and a range of the handover area also needs to be periodically updated to avoid impact of a temporary road obstacle, a severe weather condition, or the like on received signal quality. A specific measurement period is determined based on a feature of an actual road scenario and should be much greater than a handover execution time.

According to the cell handover method provided in this embodiment of this application, the MEC server obtains measurement results obtained by the source cell and the target cell by measuring the uplink signal of the test mobile terminal for a plurality of times, to obtain the handover area including location points at which signal strength received by the terminal from two cell base stations is approximate in the overlapping area between the source cell and the target cell. The cell handover is performed in the handover area, to improve a success rate of the cell handover.

Optionally, the MEC server may determine, based on the status information and the information about the handover area, a handover time point at which a serving cell of the mobile terminal is switched from the source cell to the target cell. Sending, by the MEC server, an identifier of the target cell to the mobile terminal using the source cell may be sending the identifier of the target cell and information about the handover time point to the mobile terminal using the source cell.

In an optional embodiment, the MEC server may determine the handover time point with reference to the status information, the information about the handover area, and at least one of transition duration information and resource configuration information. The transition duration information is used to indicate duration required by the source cell and the target cell for transiting a PDCP SN status of the mobile terminal, and the resource configuration information is used to indicate current usage of an uplink resource of the target cell.

It should be understood that the transition duration is considered when the MEC server determines the handover time point such that when the mobile terminal performs the cell handover, the source cell and the target cell have completed the transition of the SN status. Therefore, when the handover time point comes, the source cell and the target cell have performed a step in a handover procedure in advance such that the handover procedure is simplified, and the terminal can smoothly hand over from the source cell to the target cell to improve quality of user experience in a cell handover process.

Optionally, the MEC server further sends an identifier of the mobile terminal and the information about the handover time point to the target cell. After both learning that the mobile terminal needs to perform the cell handover at the handover time point, the source cell and the target cell prepare for the cell handover in advance. For example, the source cell transits the SN status in advance. Alternatively, the target cell reserves an uplink resource for the mobile terminal in advance. This is not limited in this embodiment of this application.

For example, the MEC server may calculate, based on the status information of the mobile terminal, duration required by the mobile terminal for entering the handover area from a current location, and then obtain a time point at which the mobile terminal enters the handover area. The handover area includes a plurality of location points. Therefore, the time point calculated herein is a set T1. There should be a difference between the handover time point and a current time point, to ensure that the terminal can receive a "handover command" before the handover time point comes. In addition, a source base station and a target base station can complete transition of the SN status and a data forwarding process. Duration required by these processes may be estimated by the base station and the MEC server. Time points satisfying a condition are sifted out from the foregoing time point set to form a set T2.

In addition, the MEC server may further comprehensively inspect usage of a time frequency resource of the target base station, select, through proper resource scheduling, an optimal time point from T2 to be a handover time point predictor (for example, a subframe or a slot in a frame) of the handover terminal, and allocate the uplink resource to the handover terminal in the predicted handover slot.

Optionally, the MEC server may further determine, with reference to the handover time point and the current usage of the uplink resource of the target cell, an uplink resource reserved by the target cell for the mobile terminal. The sending, by the MEC server, an identifier of the target cell to the mobile terminal using the source cell may be sending the identifier of the target cell, the information about the handover time point, and information about the uplink resource to the mobile terminal using the source cell.

Optionally, in step S340, the MEC server may notify the source cell and the mobile terminal of the identifier of the target cell, the information about the handover time point, and the information about the uplink resource. The mobile terminal directly disconnects a connection to the source cell at the handover time point, and sets up, without random access, a connection to the target cell using the uplink resource reserved by the target cell for the mobile terminal, to improve the efficiency of the cell handover.

In addition, after disconnecting the connection to the mobile terminal at the handover time point, the source cell directly releases an RRC resource allocated to the mobile terminal to leave the RRC resource to serve another mobile terminal, thereby improving utilization of the RRC resource of the source cell.

In addition, the MEC server may notify the target cell of the identifier of the mobile terminal, the information about the handover time point, and the information about the uplink resource. The target cell only needs to reserve the resource for the mobile terminal at the handover time point, and can freely allocate the resource at other time points, thereby improving utilization of the uplink resource of the target cell.

Optionally, the MEC server may obtain system timing of the source cell and system timing of the target cell, and determine a timing advance of the mobile terminal based on a difference between the system timing of the source cell and the system timing of the target cell. The timing advance is used by the mobile terminal to synchronize with the target cell. The MEC server sends information about the timing advance to the mobile terminal using the source cell.

In an optional embodiment, after receiving the timing advance, the mobile terminal may perform timing synchronization with the target cell based on system timing of the mobile terminal and the timing advance.

In addition, the mobile terminal may receive a primary signal, a secondary signal, a reference signal, and the like that are sent by the target cell, to automatically establish uplink synchronization with the target cell. This is not limited in this embodiment of this application.

Figure 4:
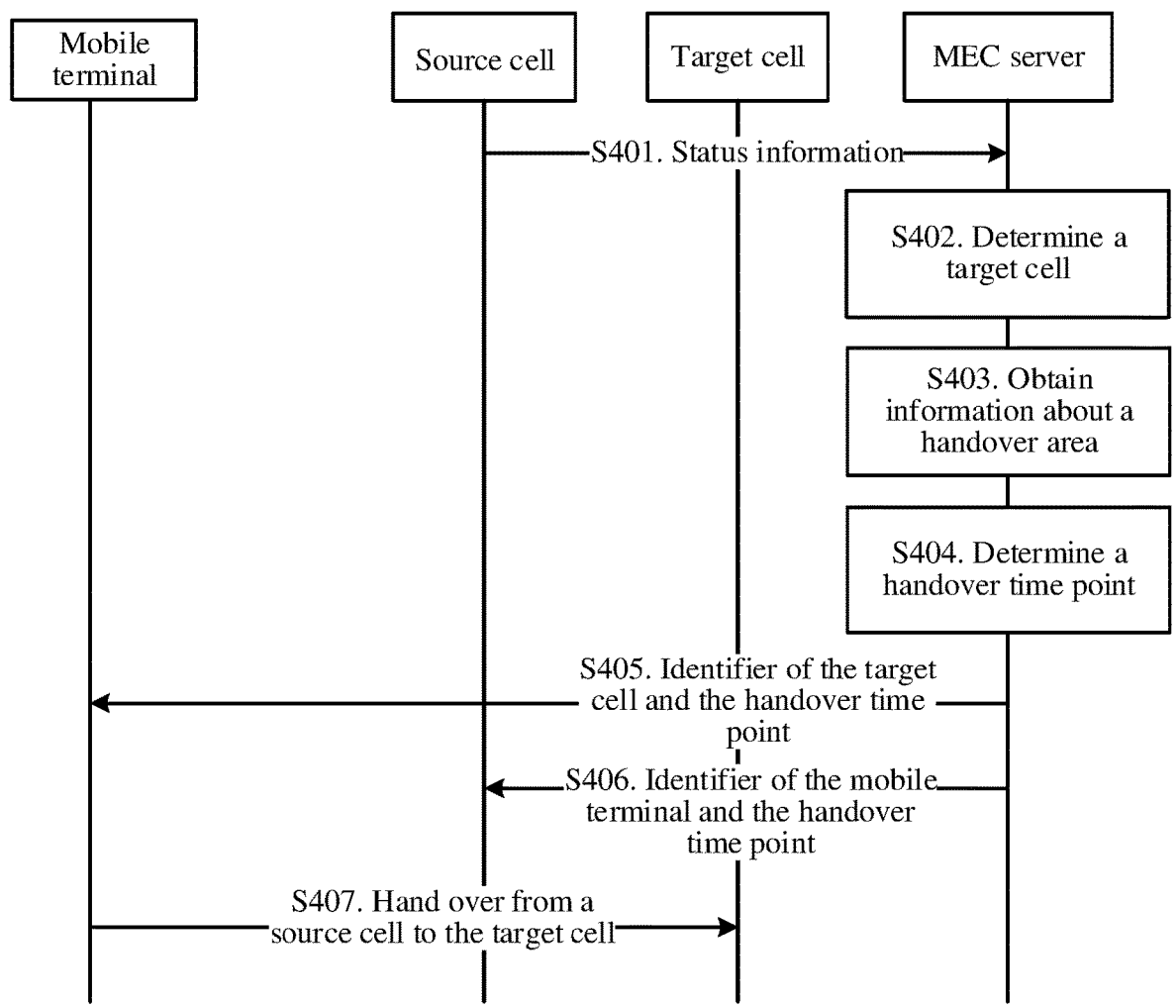
FIG. 4 is a schematic flowchart of another cell handover method according to an embodiment of this application.

FIG. 4 is a schematic flowchart of another cell handover method 400 according to an embodiment of this application.

Step S401: A source cell sends status information of a mobile terminal to a MEC server, where the status information includes location information and speed information, the source cell serves the mobile terminal, and the MEC server serves the source cell.

Step S402: The MEC server determines a target cell based on the status information, where the MEC server serves the target cell, the target cell is neighboring to the source cell, and coverage of the target cell partially overlaps coverage of the source cell.

Step S403: The MEC server obtains information about a handover area between the source cell and the target cell, where the handover area is used for cell handover of the mobile terminal.

It should be understood that there is a handover area used by the mobile terminal to perform the cell handover that is between the source cell and the target cell. More approximate signal strength of an uplink signal received by the source cell and the target cell in the handover area from the mobile terminal indicates a higher success rate of the cell handover performed by the mobile terminal in the area.

In an optional embodiment, the MEC server may pre-test a test mobile terminal, and pre-store information about a handover area between any two neighboring cells within coverage of the MEC server. Alternatively, the MEC server may request, from the source cell, information about a handover area between the source cell and another cell neighboring to the source cell. This is not limited in this embodiment of this application.

The MEC server may obtain a first signal strength value obtained by the source cell by measuring an uplink signal of the test mobile terminal used for testing and a second signal strength value obtained by the target cell by measuring the uplink signal, where the test mobile terminal is located in an overlapping area between the coverage of the source cell and the coverage of the target cell, and determine an area through which the test mobile terminal passes and in which a difference between the first signal strength value and the second signal strength value is less than a first threshold as the handover area.

Step S404: The MEC server determines, based on the status information and the information about the handover area, a handover time point at which the mobile terminal hands over from the source cell to the target cell.

Optionally, the MEC server may determine, based on the handover time point and resource configuration information of the target cell, an uplink resource needing to be reserved by the target cell for the mobile terminal.

Step S405: The MEC server sends an identifier of the target cell and the handover time point to the mobile terminal using the source cell.

Optionally, the MEC server may send the identifier of the target cell, information about the handover time point, and information about the uplink resource to the mobile terminal using the source cell.

Optionally, the source cell may disconnect a connection to the mobile terminal at the handover time point, and release an RRC resource for the mobile terminal.

Optionally, the mobile terminal may disconnect the connection to the source cell at the handover time point, and set up a connection to the target cell.

Step S406. The MEC server sends an identifier of the mobile terminal and the handover time point to the target cell.

Optionally, the MEC server may send the identifier of the target cell, the information about the handover time point, and the information about the uplink resource to the mobile terminal using the source cell such that the target cell reserves the uplink resource for the mobile terminal before the handover time point.

Step S407. The mobile terminal hands over from the source cell to the target cell at the handover time point.

Further, the mobile terminal sets up, at the handover time point, the connection to the target cell using the uplink resource reserved by the target cell for the mobile terminal.

The cell handover method according to the embodiments of this application is described in detail above with reference to FIG. 3 and FIG. 4, and a cell handover apparatus according to the embodiments of this application is described below with reference to FIG. 5 to FIG. 12.

Figure 5:
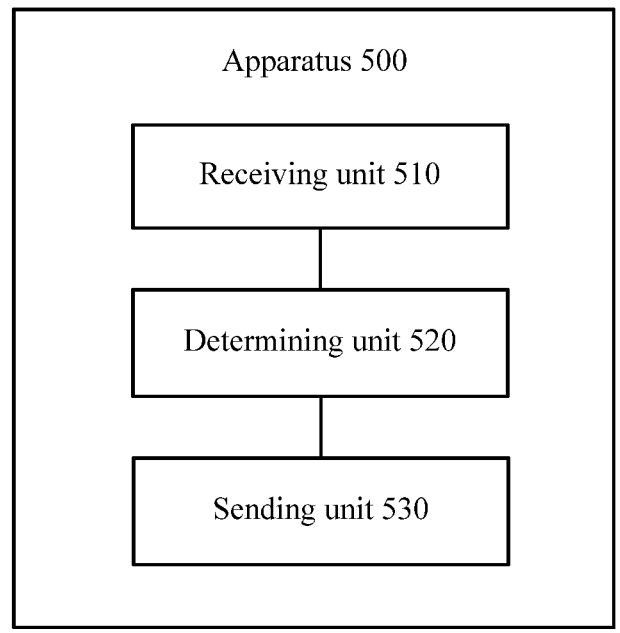
FIG. 5 is a schematic block diagram of a cell handover apparatus according to an embodiment of this application.

FIG. 5 shows a cell handover apparatus 500 according to an embodiment of this application. The apparatus 500 may be, for example, the MEC server in the foregoing embodiments, but this is not limited in this embodiment of this application. As shown in FIG. 5, the apparatus 500 includes a receiving unit 510 configured to receive status information of a mobile terminal that is sent by a source cell, where the status information includes location information and speed information, the source cell serves the mobile terminal, and the MEC server serves the source cell, a determining unit 520 configured to determine a target cell based on the status information received by the receiving unit 510, where the MEC server serves the target cell, the target cell is neighboring to the source cell, and coverage of the target cell partially overlaps coverage of the source cell, and a sending unit 530 configured to send, to the mobile terminal using the source cell, an identifier of the target cell determined by the determining unit 520.

Optionally, the apparatus 500 further includes an obtaining unit (not shown). The obtaining unit is configured to obtain information about a handover area between the source cell and the target cell. The handover area is used for cell handover of the mobile terminal. The determining unit 520 is further configured to determine, based on the status information and the information about the handover area, a handover time point at which a serving cell of the mobile terminal is switched from the source cell to the target cell. The sending unit 530 is further configured to send the identifier of the target cell and information about the handover time point to the mobile terminal using the source cell.

Optionally, the obtaining unit is further configured to obtain a first signal strength value obtained by the source cell by measuring an uplink signal of a test mobile terminal used for testing and a second signal strength value obtained by the target cell by measuring the uplink signal, where the test mobile terminal is located in an overlapping area between the coverage of the source cell and the coverage of the target cell, and determine an area through which the test mobile terminal passes and in which a difference between the first signal strength value and the second signal strength value is less than a first threshold as the handover area.

Optionally, the determining unit 520 is further configured to determine the handover time point based on the status information, the information about the handover area, and at least one of transition duration information and resource configuration information. The transition duration information is used to indicate duration required by the source cell and the target cell for transiting a PDCP SN status of the mobile terminal, and the resource configuration information is used to indicate current usage of an uplink resource of the target cell.

Optionally, the determining unit 520 is further configured to determine, based on the handover time point and the current usage of the uplink resource of the target cell, an uplink resource reserved by the target cell for the mobile terminal. The sending unit 530 is further configured to send the identifier of the target cell, the information about the handover time point, and information about the uplink resource to the mobile terminal using the source cell.

Optionally, the sending unit 530 is further configured to send an identifier of the mobile terminal, the information about the handover time point, and the information about the uplink resource to the target cell after the uplink resource reserved by the target cell for the mobile terminal is determined based on the handover time point and the current usage of the uplink resource of the target cell.

It should be understood that the apparatus 500 herein is represented in a form of a functional unit. The term "unit" herein may refer to an application-specific integrated circuit (ASIC), an electronic circuit, a processor for performing one or more software or firmware programs (for example, a shared processor, a proprietary processor, or a packet processor) and a memory, a combined logic circuit, and/or another appropriate component supporting the described function. In an optional example, a person skilled in the art may understand that the apparatus 500 may be the MEC server in the foregoing embodiments. The apparatus 500 may be configured to perform each procedure and/or step corresponding to the MEC server in the foregoing method embodiments. To avoid repetition, details are not described herein again.

Figure 6:
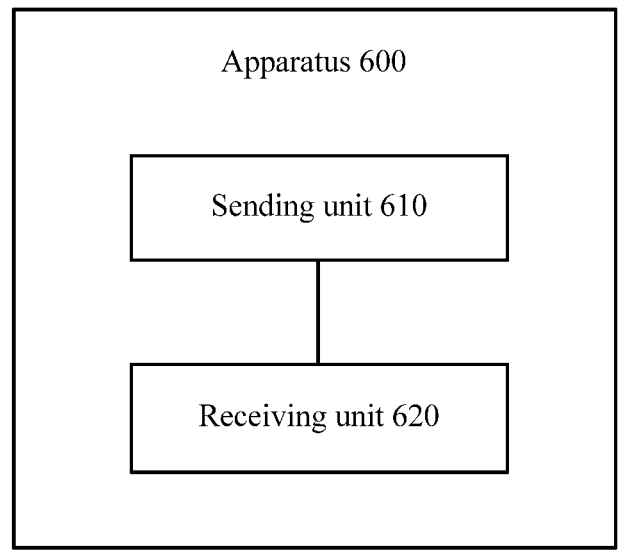
FIG. 6 is a schematic block diagram of another cell handover apparatus according to an embodiment of this application.

FIG. 6 shows a cell handover apparatus 600 according to an embodiment of this application. The apparatus 600 may be, for example, the source cell in the foregoing embodiments, but this is not limited in this embodiment of this application. As shown in FIG. 6, the apparatus 600 includes a sending unit 610 configured to send status information of a mobile terminal to a MEC server, where the status information includes location information and speed information, the MEC server serves a source cell, and the source cell serves the mobile terminal, and a receiving unit 620 configured to receive an identifier of a target cell that is sent by the MEC server based on the status information sent by the sending unit 610.

The sending unit 610 is further configured to send the identifier of the target cell to the mobile terminal.

Optionally, the receiving unit 620 is further configured to receive at least one of information about a handover time point at which a serving cell of the mobile terminal is switched from the source cell to the target cell and information about an uplink resource reserved by the target cell for the mobile terminal that are sent by the MEC server based on the status information. The sending unit 610 is further configured to send the identifier of the target cell and the at least one of the information about the handover time point and the information about the uplink resource to the mobile terminal.

Optionally, the apparatus 600 further includes a processing unit (not shown). The processing unit is configured to disconnect a connection to the mobile terminal at the handover time point after the identifier of the target cell and the at least one of the information about the handover time point and the information about the uplink resource are sent to the mobile terminal.

Optionally, the sending unit 610 is further configured to send information about an SN status of the mobile terminal to the target cell before the connection to the mobile terminal is disconnected at the handover time point.

It should be understood that the apparatus 600 herein is represented in a form of a functional unit. The term "unit" herein may refer to an ASIC, an electronic circuit, a processor for performing one or more software or firmware programs (for example, a shared processor, a proprietary processor, or a packet processor) and a memory, a combined logic circuit, and/or another appropriate component supporting the described function. In an optional example, a person skilled in the art may understand that the apparatus 600 may be the source cell in the foregoing embodiments. The apparatus 600 may be configured to perform each procedure and/or step corresponding to the source cell in the foregoing method embodiments. To avoid repetition, details are not described herein again.

Figure 7:
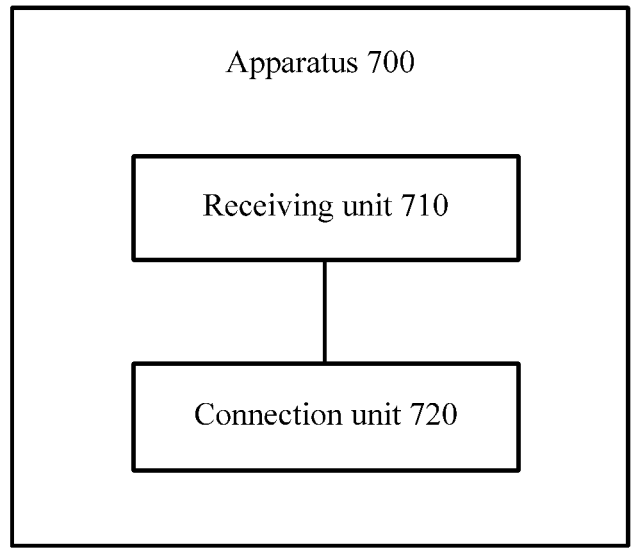
FIG. 7 is a schematic block diagram of still another cell handover apparatus according to an embodiment of this application.

FIG. 7 shows a cell handover apparatus 700 according to an embodiment of this application. The apparatus 700 may be, for example, the target cell in the foregoing embodiments, but this is not limited in this embodiment of this application. As shown in FIG. 7, the apparatus 700 includes a receiving unit 710 configured to receive an identifier of a mobile terminal and at least one of information about a handover time point at which the mobile terminal performs cell handover and information about an uplink resource reserved by a target cell for the mobile terminal that are sent by a MEC server, and a connection unit 720 configured to set up a connection to the mobile terminal based on the identifier of the mobile terminal and the at least one of the handover time point and the uplink resource that are received by the receiving unit 710.

Optionally, the receiving unit 710 is further configured to receive, before the connection to the mobile terminal is set up based on the identifier of the mobile terminal and the at least one of the handover time point and the uplink resource, information about an SN status of the mobile terminal that is sent by a source cell.

It should be understood that the apparatus 700 herein is represented in a form of a functional unit. The term "unit" herein may refer to an ASIC, an electronic circuit, a processor for performing one or more software or firmware programs (for example, a shared processor, a proprietary processor, or a packet processor) and a memory, a combined logic circuit, and/or another appropriate component supporting the described function. In an optional example, a person skilled in the art may understand that the apparatus 700 may be the target cell in the foregoing embodiments. The apparatus 700 may be configured to perform each procedure and/or step corresponding to the target cell in the foregoing method embodiments. To avoid repetition, details are not described herein again.

Figure 8:
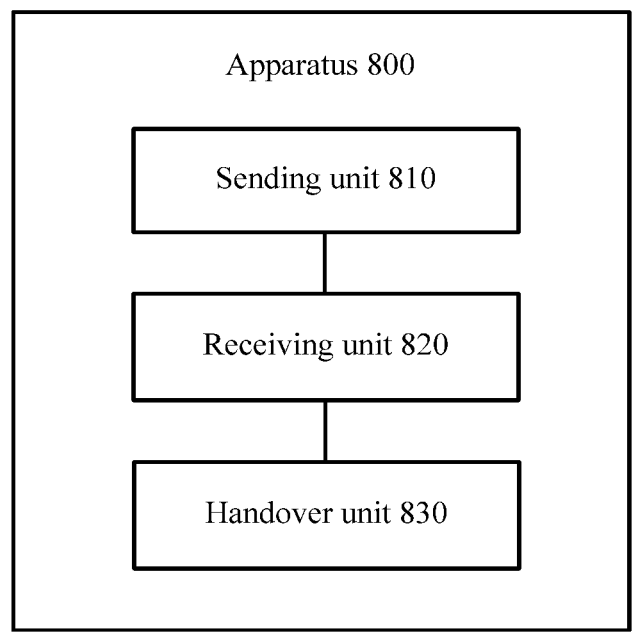
FIG. 8 is a schematic block diagram of still another cell handover apparatus according to an embodiment of this application.

FIG. 8 shows a cell handover apparatus 800 according to an embodiment of this application. The apparatus 800 may be, for example, the mobile terminal in the foregoing embodiments, but this is not limited in this embodiment of this application. As shown in FIG. 8, the apparatus 800 includes a sending unit 810 configured to send status information to a MEC server using a source cell, where the status information includes location information and speed information of a mobile terminal, the MEC server serves the source cell, and the source cell serves the mobile terminal, a receiving unit 820 configured to receive an identifier of a target cell that is sent by the MEC server based on the status information sent by the sending unit 810, and a handover unit 830 configured to hand over from the source cell to the target cell based on the identifier of the target cell that is received by the receiving unit 820.

Optionally, the receiving unit 820 is further configured to receive information that is sent by the MEC server based on the status information and that is about a handover time point at which the mobile terminal hands over from the source cell to the target cell. The handover unit 830 is further configured to hand over from the source cell to the target cell based on the identifier of the target cell and the information about the handover time point.

Optionally, the receiving unit 820 is further configured to receive information that is sent by the MEC server based on the status information and that is about an uplink resource reserved by the target cell for the mobile terminal. The handover unit 830 is further configured to hand over from the source cell to the target cell based on the identifier of the target cell, the information about the handover time point, and the information about the uplink resource.

Optionally, the apparatus 800 further includes a processing unit (not shown). The processing unit is configured to disconnect a connection to the source cell at the handover time point after the mobile terminal receives the information that is sent by the MEC server based on the status information and that is about the handover time point at which the mobile terminal hands over from the source cell to the target cell.

It should be understood that the apparatus 800 herein is represented in a form of a functional unit. The term "unit" herein may refer to an ASIC, an electronic circuit, a processor for performing one or more software or firmware programs (for example, a shared processor, a proprietary processor, or a packet processor) and a memory, a combined logic circuit, and/or another appropriate component supporting the described function. In an optional example, a person skilled in the art may understand that the apparatus 800 may be the mobile terminal in the foregoing embodiments. The apparatus 800 may be configured to perform each procedure and/or step corresponding to the mobile terminal in the foregoing method embodiments. To avoid repetition, details are not described herein again.

Figure 9:
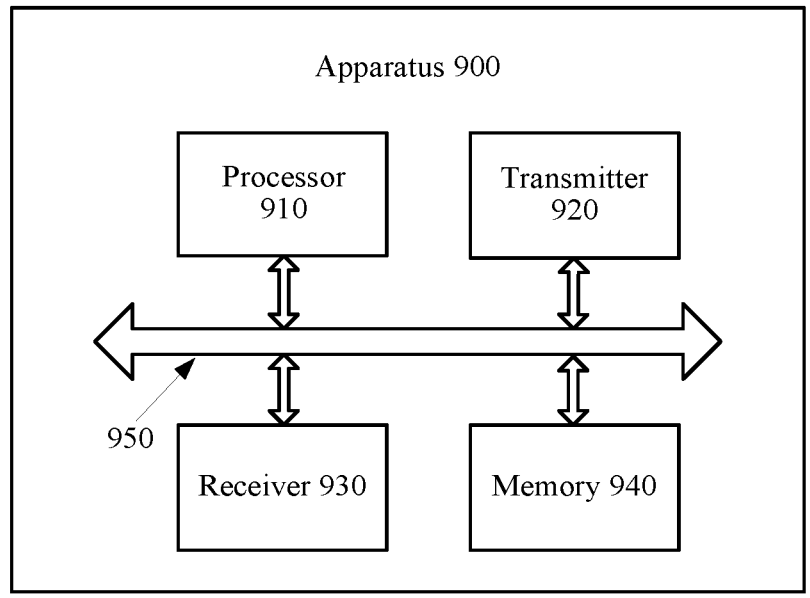
FIG. 9 is a schematic block diagram of still another cell handover apparatus according to an embodiment of this application.

FIG. 9 shows another cell handover apparatus 900 according to an embodiment of this application. The apparatus 900 includes a processor 910, a transmitter 920, a receiver 930, a memory 940, and a bus system 950. The processor 910, the transmitter 920, the receiver 930, and the memory 940 are connected using the bus system 950. The memory 940 is configured to store an instruction. The processor 910 is configured to execute the instruction stored in the memory 940 to control the transmitter 920 to send a signal or control the receiver 930 to receive a signal. The transmitter 920 and the receiver 930 may be communications interfaces. Further, the transmitter 920 may be an interface configured to receive data and/or an instruction. The receiver 930 may be an interface configured to send data and/or an instruction. Examples of specific forms of the transmitter 920 and the receiver 930 are not listed for description herein.

It should be understood that the apparatus 900 may be the MEC server in the foregoing embodiments, and may be configured to perform each step and/or procedure corresponding to the MEC server in the foregoing method embodiments. Optionally, the memory 940 may include a read-only memory (ROM) and a random access memory (RAM), and provide an instruction and data to the processor 910. A part of the memory 940 may further include a non-volatile RAM (NVRAM). For example, the memory 940 may further store information of a device type. The processor 910 may be configured to execute the instruction stored in the memory 940, and when executing the instruction, the processor 910 may perform each step corresponding to the MEC server in the foregoing method embodiments.

It should be understood that in this embodiment of this application, the processor 910 may be a central processing unit (CPU). The processor 910 may alternatively be another general-purpose processor, a digital signal processor (DSP), an ASIC, a field programmable gate array (FPGA), another programmable logic device, a discrete gate, a transistor logic device, a discrete hardware component, or the like. The general-purpose processor may be a microprocessor. Alternatively, the processor 910 may be any conventional processor or the like.

Figure 10:
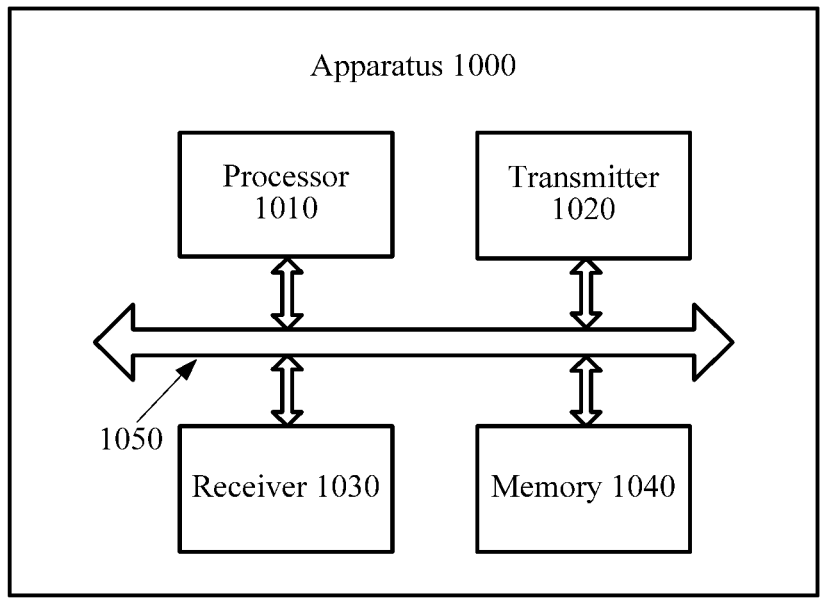
FIG. 10 is a schematic block diagram of still another cell handover apparatus according to an embodiment of this application.

FIG. 10 shows another cell handover apparatus 1000 according to an embodiment of this application. The apparatus 1000 includes a processor 1010, a transmitter 1020, a receiver 1030, a memory 1040, and a bus system 1050. The processor 1010, the transmitter 1020, the receiver 1030, and the memory 1040 are connected using the bus system 1050. The memory 1040 is configured to store an instruction. The processor 1010 is configured to execute the instruction stored in the memory 1040 to control the transmitter 1020 to send a signal or control the receiver 1030 to receive a signal. The transmitter 1020 and the receiver 1030 may be communications interfaces. Further, the transmitter 1020 may be an interface configured to receive data and/or an instruction. The receiver 1030 may be an interface configured to send data and/or an instruction. Examples of specific forms of the transmitter 1020 and the receiver 1030 are not listed for description herein.

It should be understood that the apparatus 1000 may be the source cell in the foregoing embodiments, and may be configured to perform each step and/or procedure corresponding to the source cell in the foregoing method embodiments. Optionally, the memory 1040 may include a ROM and a RAM, and provide an instruction and data to the processor 1010. A part of the memory 1040 may further include an NVRAM. For example, the memory 1040 may further store information of a device type. The processor 1010 may be configured to execute the instruction stored in the memory 1040, and when executing the instruction, the processor 1010 may perform each step corresponding to the source cell in the foregoing method embodiments.

It should be understood that in this embodiment of this application, the processor 1010 may be a CPU. Alternatively, the processor 1010 may be another general-purpose processor, a DSP, an ASIC, an FPGA, another programmable logic device, a discrete gate, a transistor logic device, a discrete hardware component, or the like. The general-purpose processor may be a microprocessor. Alternatively, the processor 1010 may be any conventional processor or the like.

Figure 11:
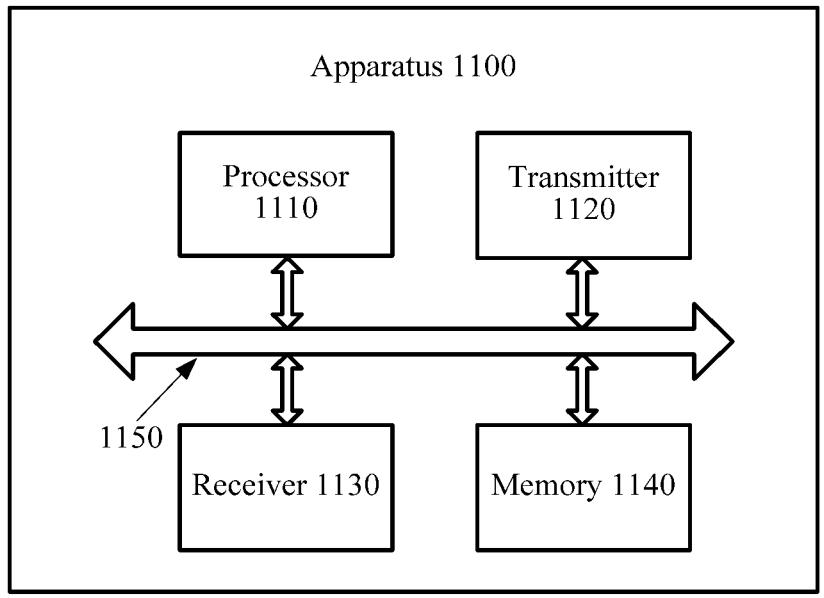
FIG. 11 is a schematic block diagram of still another cell handover apparatus according to an embodiment of this application.

FIG. 11 shows another cell handover apparatus 1100 according to an embodiment of this application. The apparatus 1100 includes a processor 1110, a transmitter 1120, a receiver 1130, a memory 1140, and a bus system 1150. The processor 1110, the transmitter 1120, the receiver 1130, and the memory 1140 are connected using the bus system 1150. The memory 1140 is configured to store an instruction. The processor 1110 is configured to execute the instruction stored in the memory 1140 to control the transmitter 1120 to send a signal or control the receiver 1130 to receive a signal. The transmitter 1120 and the receiver 1130 may be communications interfaces. Further, the transmitter 1120 may be an interface configured to receive data and/or an instruction. The receiver 1130 may be an interface configured to send data and/or an instruction. Examples of specific forms of the transmitter 1120 and the receiver 1130 are not listed for description herein.

It should be understood that the apparatus 1100 may be the target cell in the foregoing embodiments, and may be configured to perform each step and/or procedure corresponding to the target cell in the foregoing method embodiments. Optionally, the memory 1140 may include a ROM and a RAM, and provide an instruction and data to the processor 1110. A part of the memory 1140 may further include an NVRAM. For example, the memory 1140 may further store information of a device type. The processor 1110 may be configured to execute the instruction stored in the memory 1140, and when executing the instruction, the processor 1110 may perform each step corresponding to the target cell in the foregoing method embodiments.

It should be understood that in this embodiment of this application, the processor 1110 may be a CPU. Alternatively, the processor may be another general-purpose processor, a DSP, an ASIC, an FPGA, another programmable logic device, a discrete gate, a transistor logic device, a discrete hardware component, or the like. The general purpose processor may be a microprocessor. Alternatively, the processor 1110 may be any conventional processor or the like.

Figure 12:
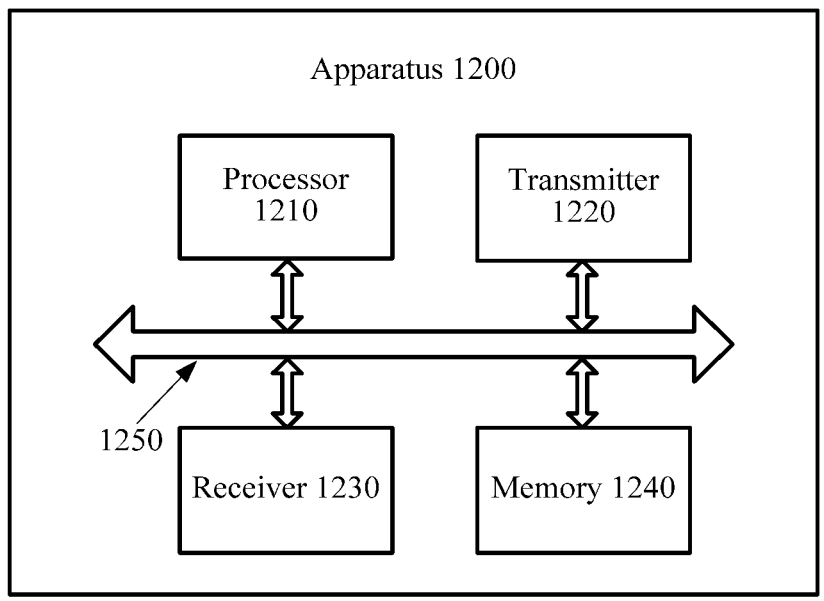
FIG. 12 is a schematic block diagram of still another cell handover apparatus according to an embodiment of this application.

FIG. 12 shows another cell handover apparatus 1200 according to an embodiment of this application. The apparatus 1200 includes a processor 1210, a transmitter 1220, a receiver 1230, a memory 1240, and a bus system 1250. The processor 1210, the transmitter 1220, the receiver 1230, and the memory 1240 are connected using the bus system 1250. The memory 1240 is configured to store an instruction. The processor 1210 is configured to execute the instruction stored in the memory 1240 to control the transmitter 1220 to send a signal or control the receiver 1230 to receive a signal. The transmitter 1220 and the receiver 1230 may be communications interfaces. Further, the transmitter 1220 may be an interface configured to receive data and/or an instruction. The receiver 1230 may be an interface configured to send data and/or an instruction. Examples of specific forms of the transmitter 1220 and the receiver 1230 are not listed for description herein.

It should be understood that the apparatus 1200 may be the mobile terminal in the foregoing embodiments, and may be configured to perform each step and/or procedure corresponding to the mobile terminal in the foregoing method embodiments. Optionally, the memory 1240 may include a ROM and a RAM, and provide an instruction and data to the processor 1210. A part of the memory 1240 may further include an NVRAM. For example, the memory 1240 may further store information of a device type. The processor 1210 may be configured to execute the instruction stored in the memory 1240, and when executing the instruction, the processor 1210 may perform each step corresponding to the mobile terminal in the foregoing method embodiments.

It should be understood that in this embodiment of this application, the processor 1210 may be a CPU. Alternatively, the processor 1210 may be another general-purpose processor, a DSP, an ASIC, an FPGA, another programmable logic device, a discrete gate, a transistor logic device, a discrete hardware component, or the like. The general purpose processor may be a microprocessor. Alternatively, the processor 1210 may be any conventional processor or the like.

In an implementation process, steps in the foregoing methods can be implemented using a hardware integrated logic circuit in the processor, or using instructions in a form of software. The steps of the method disclosed with reference to the embodiments of this application may be directly performed by a hardware processor, or may be performed using a combination of hardware in the processor and a software module. The software module may be located in a mature storage medium in the art, such as a RAM, a flash memory, a ROM, a programmable ROM (PROM), an electrically erasable PROM (EEPROM) or a register. The storage medium is located in the memory, and the processor executes the instruction in the memory and completes the steps in the foregoing methods in combination with hardware of the processor. To avoid repetition, details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments in this application.

When the integrated unit is implemented in the form of a software functional unit and sold or used as an independent product, the integrated unit may be stored in a computer-readable storage medium. Based on such an understanding, the technical solutions of this application essentially, or the part contributing to the other approaches, or all or some of the technical solutions may be implemented in the form of a software product. The software product is stored in a storage medium and includes several instructions for instructing a computer device (which may be a personal computer, a server, a network device, or the like) to perform all or some of the steps of the methods described in the embodiments of this application. The foregoing storage medium includes any medium that can store program code, such as a universal serial bus (USB) flash drive, a removable hard disk, a ROM, a RAM, a magnetic disk, or a compact disc.

The foregoing descriptions are merely specific embodiments of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

What is claimed is:

1. A cell handover method, comprising:
    receiving, by a mobile edge computing (MEC) server, status information of a mobile terminal from a source cell, wherein the status information comprises location information and speed information, wherein the source cell serves the mobile terminal, and wherein the MEC server serves the source cell;
    determining, by the MEC server, a target cell based on the status information, wherein the MEC server further serves the target cell, wherein the target cell neighbors the source cell, and wherein coverage of the target cell partially overlaps coverage of the source cell;
    sending, by the MEC server, an identifier of the target cell to the mobile terminal using the source cell;
    obtaining, by the MEC server, information about a handover area between the source cell and the target cell, wherein the handover area is used for cell handover of the mobile terminal; and
    determining, by the MEC server based on the status information and the information about the handover area, a handover time point at which a serving cell of the mobile terminal is switched from the source cell to the target cell,
    wherein sending the identifier of the target cell to the mobile terminal comprises sending, by the MEC server, the identifier of the target cell and information about the handover time point to the mobile terminal using the source cell.

2. The cell handover method of claim 1, wherein obtaining the information about the handover area comprises:
    obtaining, by the MEC server, a first signal strength value obtained by the source cell by measuring an uplink signal of a test mobile terminal used for testing and a second signal strength value obtained by the target cell by measuring the uplink signal, wherein the test mobile terminal is located in an overlapping area between the coverage of the source cell and the coverage of the target cell; and
    determining, by the MEC server, an area through which the test mobile terminal passes and in which a difference between the first signal strength value and the second signal strength value is less than a first threshold as the handover area.

3. The cell handover method of claim 1, wherein determining the handover time point comprises determining, by the MEC server, the handover time point based on the status information, the information about the handover area, and at least one of transition duration information or resource configuration information, wherein the transition duration information indicates duration required by the source cell and the target cell for transmitting a Packet Data Convergence Protocol (PDCP) sequence number (SN) status of the mobile terminal, and wherein the resource configuration information indicates current usage of an uplink resource of the target cell.

4. The cell handover method of claim 3, further comprising determining, by the MEC server based on the handover time point and the current usage of the uplink resource of the target cell, an uplink resource reserved by the target cell for the mobile terminal, and wherein sending the identifier of the target cell and the information about the handover time point to the mobile terminal comprises sending, by the MEC server, the identifier of the target cell, the information about the handover time point, and information about the uplink resource to the mobile terminal using the source cell.

5. The cell handover method of claim 4, wherein after determining the uplink resource reserved by the target cell for the mobile terminal, the cell handover method further comprises sending, by the MEC server, an identifier of the mobile terminal, the information about the handover time point, and the information about the uplink resource to the target cell.

6. A cell handover method, comprising:
sending, by a mobile terminal, status information to a mobile edge computing (MEC) server using a source cell, wherein the status information comprises location information and speed information of the mobile terminal, wherein the MEC server serves the source cell, and wherein the source cell serves the mobile terminal;
receiving, by the mobile terminal, an identifier of a target cell from the MEC server based on the status information;
handing over, by the mobile terminal, the mobile terminal from the source cell to the target cell based on the identifier of the target cell; and
receiving, by the mobile terminal, information from the MEC server about a handover time point at which the mobile terminal to be handed over from the source cell to the target cell based on the status information,
wherein handing over the mobile terminal from the source cell to the target cell comprises handing over, by the mobile terminal, the mobile terminal from the source cell to the target cell based on the identifier of the target cell and the information about the handover time point.

7. The cell handover method of claim 6, further comprising receiving, by the mobile terminal, information from the MEC server about an uplink resource reserved by the target cell for the mobile terminal based on the status information, and wherein handing over the mobile terminal from the source cell to the target cell comprises handing over, by the mobile terminal, the mobile terminal from the source cell to the target cell based on the identifier of the target cell, the information about the handover time point, and the information about the uplink resource.

8. The cell handover method of claim 6, wherein after receiving the information about the handover time point, the cell handover method further comprises disconnecting, by the mobile terminal, a connection to the source cell at the handover time point.

9. A cell handover apparatus, comprising:
at least one processor;
a receiver coupled to the at least one processor and configured to receive status information of a mobile terminal from a source cell, wherein the status information comprises location information and speed information, wherein the source cell serves the mobile terminal, and wherein a mobile edge computing (MEC) server serves the source cell;
a non-transitory computer-readable storage medium coupled to the at least one processor and configured to store programming instructions for execution by the at least one processor, wherein the programming instructions cause the at least one processor to be configured to determine a target cell based on the status information, wherein the MEC server further serves the target cell, wherein the target cell neighbors the source cell, and wherein coverage of the target cell partially overlaps coverage of the source cell; and a transmitter coupled to the at least one processor and configured to send, to the mobile terminal using the source cell, an identifier of the target cell,
wherein the receiver is further configured to obtain information about a handover area between the source cell and the target cell, wherein the handover area is used for cell handover of the mobile terminal, wherein the programming instructions further cause the at least one processor to be configured to determine, based on the status information and the information about the handover area, a handover time point at which a serving cell of the mobile terminal is switched from the source cell to the target cell, and wherein the transmitter is further configured to send the identifier of the target cell and information about the handover time point to the mobile terminal using the source cell.

10. The cell handover apparatus of claim 9, wherein the receiver is further configured to obtain a first signal strength value obtained by the source cell by measuring an uplink signal of a test mobile terminal used for testing and a second signal strength value obtained by the target cell by measuring the uplink signal, wherein the test mobile terminal is located in an overlapping area between the coverage of the source cell and the coverage of the target cell, and wherein the programming instructions further cause the at least one processor to be configured to determine an area through which the test mobile terminal passes and in which a difference between the first signal strength value and the second signal strength value is less than a first threshold as the handover area.

11. The cell handover apparatus of claim 9, wherein the programming instructions further cause the at least one processor to be configured to determine the handover time point based on the status information, the information about the handover area, and at least one of transition duration information or resource configuration information, wherein the transition duration information indicates duration required by the source cell and the target cell for transiting a Packet Data Convergence Protocol (PDCP) sequence number (SN) status of the mobile terminal, and wherein the resource configuration information indicates current usage of an uplink resource of the target cell.

12. The cell handover apparatus of claim 11, wherein the programming instructions further cause the at least one processor to be configured to determine, based on the handover time point and the current usage of the uplink resource of the target cell, an uplink resource reserved by the target cell for the mobile terminal, and wherein the transmitter is further configured to send the identifier of the target cell, the information about the handover time point, and information about the uplink resource to the mobile terminal using the source cell.

13. The cell handover apparatus of claim 12, wherein after determining the uplink resource reserved by the target cell for the mobile terminal, the transmitter is further configured to send an identifier of the mobile terminal, the information about the handover time point, and the information about the uplink resource to the target cell.

14. A cell handover apparatus, comprising:
at least one processor;
a transmitter coupled to the at least one processor and configured to send status information to a mobile edge computing (MEC) server using a source cell, wherein the status information comprises location information and speed information of a mobile terminal, wherein the MEC server serves the source cell, and wherein the source cell serves the mobile terminal;

a receiver coupled to the at least one processor and configured to receive an identifier of a target cell from the MEC server based on the status information sent by the transmitter; and a non-transitory computer-readable storage medium coupled to the at least one processor and configured to store programming instructions for execution by the at least one processor, wherein the programming instructions cause the at least one processor to be configured to hand over the mobile terminal from the source cell to the target cell based on the identifier of the target cell, wherein the receiver is further configured to receive information, from the MEC server based on the status information, about a handover time point at which the mobile terminal to be hand over from the source cell to the target cell, and wherein the programming instructions further cause the at least one processor to be configured to hand over the mobile terminal from the source cell to the target cell based on the identifier of the target cell and the information about the handover time point.

15. The cell handover apparatus of claim 14, wherein the receiver is further configured to receive information, from the MEC server based on the status information, about an uplink resource reserved by the target cell for the mobile terminal, and wherein the programming instructions further cause the at least one processor to be configured to hand over the mobile terminal from the source cell to the target cell based on the identifier of the target cell, the information about the handover time point, and the information about the uplink resource.

16. The cell handover apparatus of claim 14, wherein after receiving the information about the handover time point, the programming instructions further cause the at least one processor to be configured to disconnect a connection to the source cell at the handover time point.

* * * * *